United States Patent
Ericson et al.

(10) Patent No.: US 9,618,762 B2
(45) Date of Patent: Apr. 11, 2017

(54) AUTOSTEREOSCOPIC DISPLAY SYSTEM

(75) Inventors: Lars Thomas Kristian Ericson, Bromma (SE); Christian Nicolai Moller, Oslo (NO)

(73) Assignee: SETRED AS, Oslo (NO)

( * ) Notice: Subject to any disclaimer, the term of this patent is extended or adjusted under 35 U.S.C. 154(b) by 42 days.

(21) Appl. No.: 14/118,152

(22) PCT Filed: May 17, 2012

(86) PCT No.: PCT/IB2012/001043
§ 371 (c)(1),
(2), (4) Date: May 8, 2014

(87) PCT Pub. No.: WO2012/156816
PCT Pub. Date: Nov. 22, 2012

(65) Prior Publication Data
US 2014/0240626 A1    Aug. 28, 2014

(30) Foreign Application Priority Data

May 17, 2011  (GB) .................................. 1108279.9
Sep. 15, 2011 (GB) .................................. 1116018.1

(51) Int. Cl.
| | | |
|---|---|---|
| G02F 1/1335 | (2006.01) |
| G02B 27/26 | (2006.01) |
| H04N 13/04 | (2006.01) |
| G02B 27/22 | (2006.01) |

(52) U.S. Cl.
CPC .......... *G02B 27/26* (2013.01); *G02B 27/225* (2013.01); *H04N 13/0411* (2013.01); *H04N 13/0413* (2013.01); *H04N 13/0418* (2013.01)

(58) Field of Classification Search
CPC .......... H04N 12/0409; H04N 12/0411; H04N 13/0409; H04N 13/0411; H04N 13/0418; H04N 13/0413; G02B 27/26; G02B 27/225
USPC .......................................................... 349/15
See application file for complete search history.

(56) References Cited

U.S. PATENT DOCUMENTS

| | | | | |
|---|---|---|---|---|
| 6,252,707 | B1 * | 6/2001 | Kleinberger ....... | G02B 27/2207 348/57 |
| 8,564,740 | B2 * | 10/2013 | Schultz .............. | H04N 13/0418 349/15 |
| 2004/0257495 | A1 * | 12/2004 | Hattori et al. .................. | 349/69 |
| 2007/0153380 | A1 | 7/2007 | Shestak | |
| 2007/0165305 | A1 * | 7/2007 | Mehrle .......................... | 359/464 |

(Continued)

FOREIGN PATENT DOCUMENTS

| | | | |
|---|---|---|---|
| EP | 1489860 A2 | 12/2004 | |
| WO | WO 2007070721 A2 | 6/2007 | |

*Primary Examiner* — Nathanael R Briggs
(74) *Attorney, Agent, or Firm* — DLA Piper LLP (US); Gianni Minutoli

(57) ABSTRACT

A three dimensional display apparatus comprising: a backlight to emit light from switchable apertures, the light being polarized; at least one light modulation panel with pixels that can be set to change the polarization of light; a polarizer that transmits light within a limited range of polarizations; where each light modulation panel can change the polarization such that the light passing through the polarizer can both increase and decrease irrespective of the polarization of light before passing the panel; and where the switching of the apertures are synchronized with the switching of the pixels on the at least one light modulation panel.

5 Claims, 6 Drawing Sheets

(56) References Cited

U.S. PATENT DOCUMENTS

2007/0195163 A1* 8/2007 Chestak ............. H04N 13/0404
                                                    348/58
2007/0257495 A1* 11/2007 Kim .......................... F03G 7/08
                                                    290/1 R
2010/0091205 A1* 4/2010 Wu .................... G02B 27/2214
                                                    349/15
2010/0097449 A1* 4/2010 Jeong ................ G02B 27/2214
                                                    348/59

* cited by examiner

AUTOSTEREOSCOPIC DISPLAY SYSTEM

CROSS REFERENCE TO RELATED APPLICATIONS

This application is a U.S. National Stage Application of International Application No. PCT/IB2012/001043 filed May 17, 2012, which claims priority from Great Britain Patent Application No. 1108279.9 filed May 17, 2011, and Great Britain Patent Application No. 1116018.1 filed Sep. 15, 2011. The entirety of all the above-listed applications are incorporated herein by reference.

The present invention relates to a three-dimensional display system, also known as an autostereoscopic display apparatus or a light field display apparatus.

BACKGROUND

A well proven method for creating a 3D image is to cause a viewer to see different perspective views of a scene with each eye. One way to do this is to display two differently polarized images on a screen, and for the viewer to wear corresponding polarizing filters on each eye.

An autostereoscopic display or a three dimensional (3D) display may be implemented using an aperture or slit array in conjunction with a two dimensional (2D) display to display a 3D image. The principle of the device is that when looking at a 2D image through a slit array, the slit array separated from the screen by a distance, then the viewer sees a different part of the 2D image with each eye. If an appropriate image is rendered and displayed on the 2D display, then a different perspective image can be displayed to each eye of the viewer without necessitating them to wear filters over each eye.

Autostereoscopic displays provide additional challenges and opportunities with regards to the image acquisition and presentation. The present invention addresses some of these.

BRIEF DESCRIPTION OF THE DRAWINGS

Embodiments disclosed herein will now be described, by way of example only, with reference to the accompanying drawings, in which.

DESCRIPTION

Figure 1:
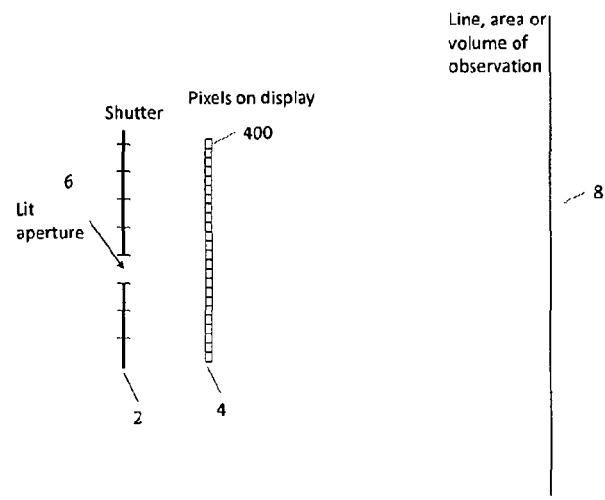
FIG. 1 shows an example autostereoscopic display using a scanning aperture array along with a 2D display.

As described above an autostereoscopic display can be achieved by using a scanning aperture array 2 along with a 2D display 4, for example as shown in FIG. 1. In a basic implementation the apertures 6 of the aperture array 2 may be slits, but they can be any shape. The aperture array 2 may be between the 2D display 4 and the viewer (numeral 8 indicating a line, area or volume of observation). The aperture array 2 may also be behind the 2D display 4 as shown in FIG. 1. In this case there may either be a uniform lightsource 10 behind the aperture array 2, or the aperture 6 itself could be the light source 10, emitting light in all direction from across the surface of the aperture. In the latter instance, only the aperture or apertures 6 that should be open at any one point in time would emit light. The aperture array 2 may be implemented as a scanning backlight using LEDs or OLEDs or some other light source. In one implementation of such a system the scanning backlight aperture array 2 would be a white light source emitting uniform light at all angles. The light emitted may also be uniform over the surface of the aperture. In another implementation the backlight aperture array 2 may have directional properties such that it only provides light for one or a number of viewing angle ranges. This could also be combined with head tracking such that the light is directed towards the view directions where a viewer is located. The aperture light source may be capable of having an on state and an off state or may be capable of other values than simply on and off.

The 2D display 4 may be a liquid crystal display (LCD) or another transmissive display. One problem with this configuration of autostereoscopic display is that it requires very high switching speed for the 2D display in order to give good depth properties and a large angle of continuous parallax. Also, in a conventional 2D LCD display there will be colour filters in order to provide the red, green and blue sub-pixels (this is the typical configuration, but other base colours may also be used). In the autostereoscopic display configuration described in FIG. 1 this may give alignment problems for pixels seen at high viewing angles where the sub-pixel and its associated colour filter are not aligned with the line of sight. Furthermore, the red, green and blue sub-pixels will have different relative intensities for different view directions which may deteriorate the colour reproduction, especially if the aperture 6 is a scanning backlight using separate red, green and blue base colour light sources. In this case one may implement the 2D display without colour filters and show each of the base colours time sequentially. However, this requires even higher switching speed for the 2D display. Diffraction and scattering effects may also affect performance.

Figure 2:
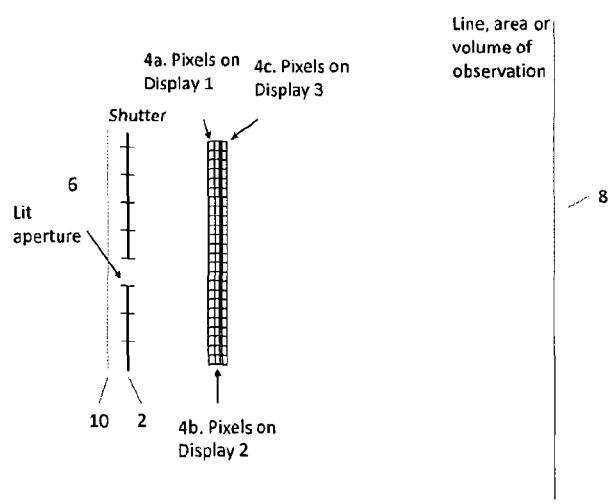
FIG. 2 shows an alternative configuration, in which the 2D display comprises more than one 2D display.

FIG. 2 shows an alternative configuration, in which the 2D display comprises more than one 2D display. In this example there are three 2D displays 4a, 4b, 4c, each for a specific base colour. For example, Display 1 (4a) may be an LCD where each pixel can take a range of values between fully transparent for all colours and fully blocking red light only (and remaining fully transparent for all other colours in all states), while Display 2 (4b) has the same properties except that it can block blue light only and Display 3 (4c) green light only. The scanning aperture light source 6 can either be made up with a white light source that combines the three bands of light frequencies that each of the displays 1 to 3 can block (red, green and blue in this example). The scanning aperture light source may also have physically separated light sources for each of the bands. The light source(s) and the display may be matched such that the light source does not emit any frequencies of visible light that the combined displays 4a, 4b, 4c cannot block.

Another example would be to have six displays where each of the red, green and blue frequency bands are split in two. There would then be one display blocking the high frequency blue only and one display blocking the low frequency blue only. Similarly the red and green would have different displays for the low and high bands.

Another example would be to have two displays where each display can block light of different polarization.

Figure 3:
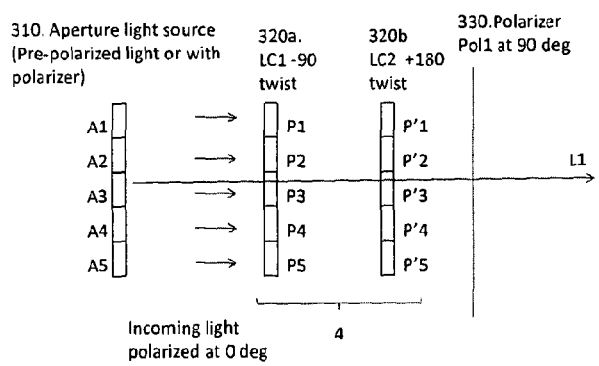
FIG. 3 show another example disclosed herein with an aperture light source.

Another example is explained in FIG. 3. Again there is an aperture light source 310. This could be designed to send out polarized light, e.g. at 0 degrees, or there could be a polarizer between the aperture light source and a display 4 comprising one or more displays 320 capable of changing the properties of light. In this example liquid crystal panels are used, but any light modulation device with suitable properties could be used. In the example of FIG. 3, there are two liquid crystal panels LC1 (320a) and LC2 (320b), for example twisted nematic cells. It should be clarified that liquid crystal cells with the desired polarization manipulation properties using other technology than that of twisted nematic cells could equally well be used. Note that the example below uses the term twist and degrees of twist, where another way to express this would be to use the term polarization rotation and polarization rotation of X degrees. A polariser 330 is provided to polarise the light that passes through the final liquid crystal panel 320b. The polariser 330 acts like a filter that limits the light reaching the viewer depending on the polarisation of the light that passes through the final liquid crystal panel.

The first panel LC1 (320a) has 0 twist in the off state and 90 degrees negative twist (anti-clockwise) in the fully on state (voltage Von). The second panel LC2 (320b) has 0 degrees twist in the off state and 180 degrees positive twist (clock-wise) in the fully on state (voltage Von). Both panels can provide intermediary twist values when a voltage V between Voff and Von is applied. Note that an off voltage of 0 is used in this example, but it could also be another voltage Voff. The twisting in the fully on state can use different values than the example used above. They may be set in such a way that
  a) the first panel LC1 can provide output such that depending on voltage applied it is capable of providing polarization that is either parallel or perpendicular to the polarization of the polarizer 330 given a fixed polarization before LC1
  b) the second panel LC2 can provide output such that depending on the voltage applied it is capable of providing polarization that is either parallel or perpendicular to the polarization of the polarizer 330 irrespective of the polarization of light before panel LC2. The possible polarization states before LC2 depends on the properties of LC1.
  c) The method is not limited to two panels. Any number of panels could be used. Each panel may then be capable of providing polarization that is either parallel or perpendicular to the polarization of the polarizer 330 irrespective of the polarization of light before entering the panel. For example a third panel in the example above could be able to provide negative twist between 0 and 180 degrees if placed after LC2. Each panel may be made up of two or more sub-panels that work together to provide the necessary properties.

The operation will now be explained with reference to an example ray L1. It leaves the aperture A3 of the aperture light source 310 with 0 degrees polarization.

Case 1: The pixel P3 on LC1 is set to 0 so the light is still 0 degrees before LC2. Pixel P'3 on LC2 could now be set to provide 0 degrees twist in which case all the light will be blocked by the polarizer 330 and the output will be black. If instead P'3 is set to a value lower than Von to provide a positive 90 degree twist, all light will pass through the polariser 330 and the output will be full intensity. P'3 could also be set to Von and provide a 180 degree twist, which again would mean that all the light is blocked by the polariser 330.

Case 2: Pixel P3 on LC1 is set to Von and the ray will have −90 degrees twist before LC2. If P'3 is set to 0 the light will still have −90 degrees twist after P'3 on LC2 and all light will pass through the polariser 330 and the output will be full intensity. If instead P'3 is set to a value lower than Von to provide a positive 90 degree twist, the output light will be at 0 degrees in which case all the light will be blocked by the polarizer 330.

Case 3: Pixel P3 on LC1 is set to Vn such that the ray will have −N degrees twist (0<N<90) before LC2. Pixel P'3 on LC2 could now be set to Vn' to provide +N degrees twist so that the output from LC2 is 0 degrees twist and the light will be blocked by the polariser 330. Pixel P'3 could also be set to Vm' to provide +M degrees twist (0<M<180). If M=N+90 the light will have 90 degrees twist after P'3 on LC2 and all light will pass through the polariser 330 and the output will be full intensity.

From the three cases above it is demonstrated that irrespective of the state of P3, P'3 can change the polarization to provide all output states. In other words, there are many combinations of states for P3 and P'3 that provide the same output states. It should be mentioned here that LC1 could also be designed to be capable of providing higher negative twist, e.g. 180 degrees, in which case there would be even more combinations of states.

Figure 4:
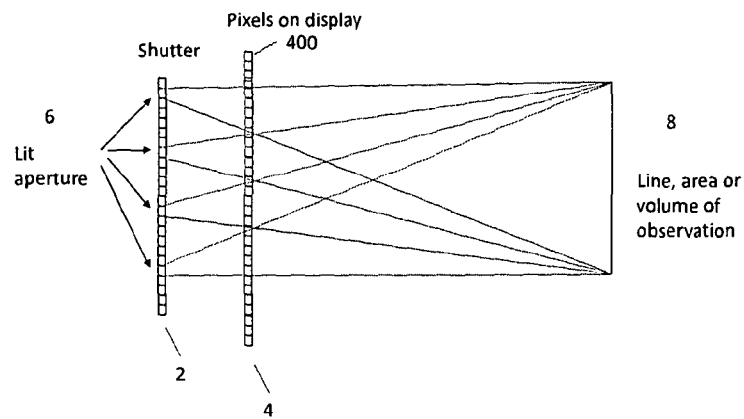
FIGS. 4 and 5 are illustrations to help explain the improvement to an autostereoscopic display system based on the principles disclosed herein.
Figure 5:
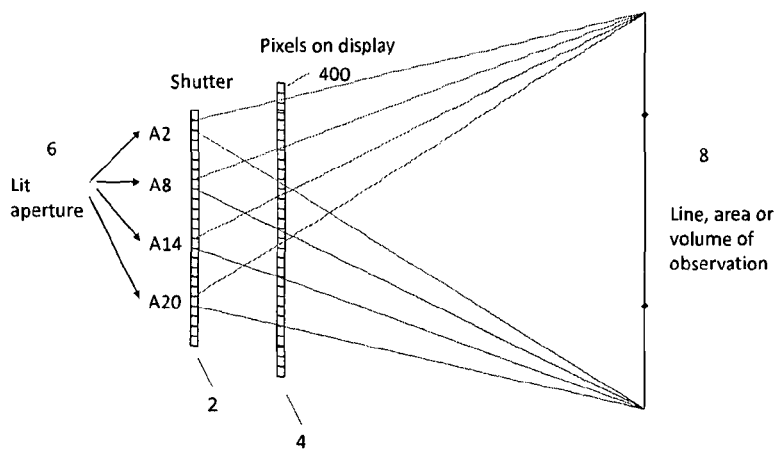

FIG. 4 and FIG. 5 explain how this can improve the autostereoscopic display system. First consider a single panel system as shown in FIG. 4. Here the line of observation is limited such that the viewer only sees one lit aperture 6 through each pixel 400 on the display 4 (boundary effects at the edge of the line of observation is ignored in this discussion). The example uses a line of observation 8, but it could also be an area or a volume.

If the line of observation 8 was increased as shown in FIG. 5 then this is not the case anymore. Here, for each pixel 400 on the display 4, there is always one position where one lit aperture 6 is seen through the pixel 400, and another position where a second lit aperture is seen through the same pixel. For a display 4 comprising a single panel this is a problem because a pixel can only take one value and the value should be independent for each lit aperture. This is why for a display comprising one display panel the line of observation is limited to that in FIG. 4. However, if two panels are used with the properties explained in FIG. 3 it is possible to widen the line of observation given a fixed distance between lit apertures (one could for example also chose to maintain the same line of observation but have a smaller distance between lit apertures).

Figure 6:
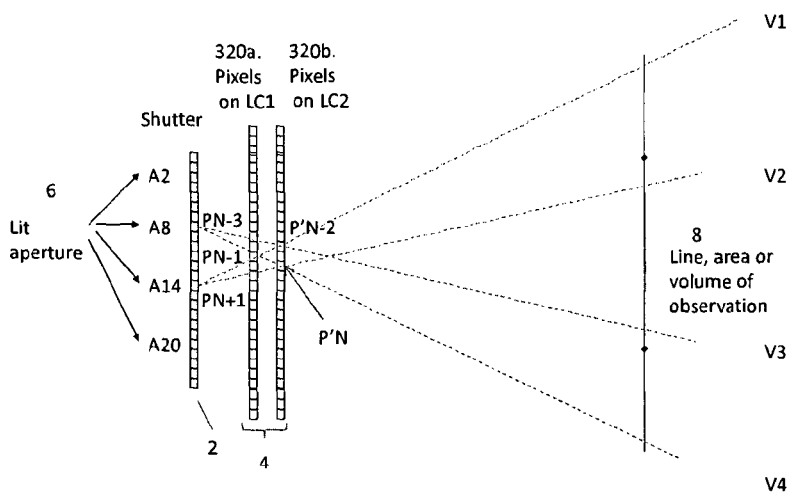
FIGS. 6 and 7 are illustrations to help explain the operations disclosed herein.

FIG. 6 explains how this may work. The figure shows all light vectors seen by the viewer in the line of observation 8 that will be dependent on the state of the pixel P'N on LC2. These vectors may be determined by considering the geometry of the system. Example:
1. First draw the vectors that pass through a lit aperture, the pixel P'N and the line of observation. This leads to vectors V2 and V4. These then pass through two pixels on LC1 (PN+1 and PN−1).
2. Vectors are then drawn that go through a lit aperture, one of those two pixels and the line of observation. The only vector that matches this criteria is V1 which passes through pixel P'N−2 on LC2.
3. Vectors are then drawn that go through a lit aperture, pixel P'N−2 and the line of observation. Apart from V1, only V3 matches this criteria and it goes through pixel PN−3 on LC1.
4. Vectors are then drawn that go through a lit aperture, pixel PN−3 and the line of observation. No additional vectors matches this criteria (V3 was derived in a previous step).

Based on the scene being shown, each of the vectors should have a value which will be called V1, V2, V3 and V4. It is now possible to set up equations to define that states that each pixel should take:

$$(PN-1)+(P'N-2)=V1$$

$$(PN+1)+(P'N)=V2$$

$$(PN-3)+(P'N-2)=V3$$

$$(PN-1)+(P'N)=V4$$

Because there are more unknowns than equations it will be possible to set states for each of the pixels to provide the correct output values. The table below shows an example of output values for the vectors and how this can be achieved through pixel values expressed as twist:

| Vector value | Required total twist | LC1 pixel twist | LC2 pixel twist |
| --- | --- | --- | --- |
| V1 = 0.3 | +150 or +30 or −30 | (PN − 1) = 0 | (P'N − 2) = 150 |
| V2 = 0.5 | +135 or +45 or −45 | (PN + 1) = −45 | (P'N) = 0 |
| V3 = 1 | +90 or −90 | (PN − 3) = −60 | (P'N − 2) = 150 |
| V4 = 0 | 0 or 180 | (PN − 1) = 0 | (P'N) = 0 |

Due to the way the line of observation is defined in this example one knows that there can never be more than five relevant interdependent vectors and then there will always be a solution. Compared to a single panel system where the values outside the line of observation will lead to a repeated zone with a correct 3D view this may not be the case in a two panel system. If this is a desired effect one may choose to have a setting where only one panel is active and the line of observation is reduced. One may also try to optimise the values set for each of the two panels to make the best possible image on one or both sides of the line of observation. This may be achieved if the design is made such that there is more than one combination of states that give the same result within the line of observation.

Note that the maximum and minimum twists (polarisation rotation) as well as the type and orientation of twist (polarisation rotation) used in the description are only examples and any twists (polarisation rotations) that achieve the same result may be used.

Figure 7:
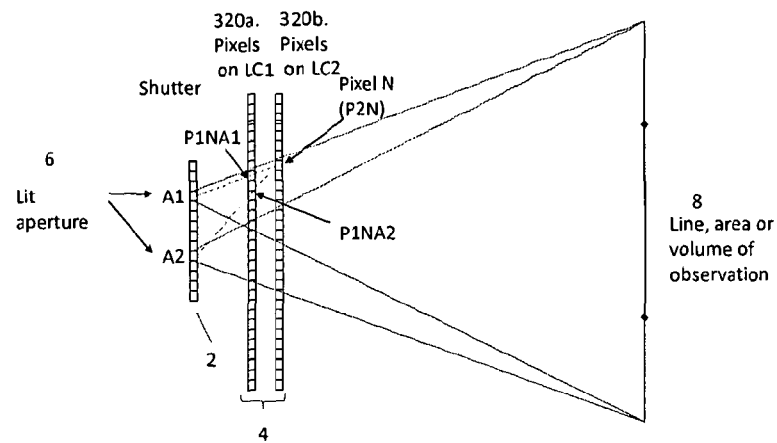

There are several ways that the pixel states for LC1 and LC2 may be determined, and several different combinations of states that will provide the same output within the line of observation. One way is computationally effective since it is based on standard slit images which may give efficient rendering, and where pixels values are calculated sequentially. This is as follows (the method may be implemented on a graphics processing unit and/or in the electronics on the display itself):

1. Standard slit images with frustums from apertures to the end of the observation line (see FIG. 5) are rendered with LC2 as the projection plane. These can be generated all at once for all apertures, or processed when required for the algorithm below. They may contain information on the position of the first pixel 400 in the slit image compared to the edge of the display 4.
2. Then there should be corresponding slit images for LC1. The same frustums are used to render slit images with LC1 as the projection plane. These can be derived directly from the scene, or they may be calculated from a linear transformation based on the geometry of apertures, LC1, LC2 and the observation line. Again these can be generated all at once for all apertures, or processed when required for the algorithm below.
3. The slit images for LC1 are projected onto the plane of LC2 from the corresponding aperture. Step 2 and 3 could be combined into a single linear operation (scaling and shift) based on the geometry of apertures, LC1, LC2 and the observation line.
4. The pixel positions on LC1 are also projected onto the plane of LC2 from the corresponding aperture. This is independent of the scene and could be pre-stored based on the display setting.
5. An image is generated where the value for each position on LC2 depends on the number of frustums for simultaneously lit apertures that cover the same position on LC1. This is a measure of the interdependences for the pixels. In this example the value is set to 0 for 1 frustum and 90 for two frustums.
6. The pixel values are now determined sequentially for both LC1 and LC2 starting at one edge of the slit image. The input will be two slit images for each lit aperture (from step 1 BP2 and step 3 BP1) and the image representing dependencies from step 5 BPF. The output will be pixel values for LC1 and LC2 respectively P1 and P2. Go stepwise based on the panel with the smaller pixel size as projected onto LC2, in this example that will be the pixel size of LC2. The annotation used is based on FIG. 7:
   a. Start at the pixel from any of the slit images with the lowest count. This is denominated pixel N.
   b. The pixel position for LC1 projected onto the position of N from aperture A1 is set to a twist of P1NA1=BPF−BP2A2−BP2A1
   c. The pixel N for LC2 is set to a twist of P2N=BP2A1−P1NA1
   d. The pixel position for LC1 projected onto the position of N from A2 is set to a twist of P1NA2=BP2A1−P2N
   e. Move to N+1 and repeat above replacing N with N+1
7. The above is repeated for all states of the display, i.e. states with a certain combination of lit apertures.

The distance between panels 320 of the display 4 can be variable. It may be made at least such that a line through a lit aperture 6 and a pixel on the first panel 320a, and a line from another lit aperture 6 and the same pixel on the first panel 320a, do not pass through the same pixel on the second panel 320b (ignoring the case where two adjacent apertures are lit simultaneously with the purpose of creating a bigger aperture). This distance can be calculated from basic geometry.

For liquid crystal panels 320 with angular properties that are not uniform it is possible to use the combination of panels to compensate for the different angular modulations. For example the voltage for different colour/greyscale states could be made unique for each offset of pixels between the LC1 and LC2 in the example above. Unlike for a 2D display one will know that a certain combination of pixel on LC1 and pixel on LC2 will be seen in a certain range of viewing angles. Pixels with zero offset will be seen from straight on (0 degrees from the display normal) while 1 pixel offset will be seen through a viewing angle that is defined by the offset of the two panels and the distance between pixels.

Colours can be handled in different ways as described earlier in the document. For example, one may use colour filters on any one or all LC panels. One may also use time sequential colours, or separate panels for different base colours.

One may choose to have more apertures/slits lit simultaneously than in the example above while maintaining the line of observation, such that it will not be possible to set unique values for each pixel and aperture combinations seen from the line of observation. In this case one may adapt principles of content-adaptive parallax barriers as explained in prior art.

The above method can be combined with having apertures where the light intensity can be varied to provide better modulation. For example if all relevant vectors are to be set in low intensity states the aperture can be made dimmer. The light intensity of the aperture could be set to vary with each sub-frame.

Another implementation is to have apertures that can emit light with variable twist (polarisation rotation) (or other suitable light property). In this case a display system could be created with only one liquid crystal panel in addition to the aperture backlight.

The above example is based on liquid crystal panels that change the light polarization. The method could also be used with panels that are capable of changing (modulating) other light properties, e.g. light frequency, in such a way that each panel can both cause an increase and a decrease in the intensity perceived by the viewer.

In a basic implementation the aperture light source 10 may have a constant intensity every time it is lit and in all directions. Depending on the features of the light-modulating 2D display one may also control the light source in one or more of the following ways:

The intensity of the light source 10 may be varied depending on the content shown. One common problem is to provide a good dynamic range with bright maximum intensity and dark minimum intensity. Hence, the intensity could be set individually for each aperture and for each time instance that the aperture is lit. By analysing the scene the intensity could be reduced for those apertures where the pixels seen through the aperture are predominantly in a dark state.

The light-modulating 2D display may also have different characteristics for different viewing angles. A given pixel will be seen from straight on when one aperture is lit, while the same pixel may be seen at 45 degrees when another aperture is lit. Likewise a given aperture will be seen from a range of angles through different pixels. Typically the angular properties for the 2D display will be similar for all pixels. The light distribution for different angles for the apertures may then be made to match the angular properties of the pixels/2D display. For example, if the pixels block twice as much light straight on compared to at 45 degrees the light intensity of the aperture could be made half straight out compared to that at 45 degrees. Another way to reduce the effect of different characteristics is to take the angular effect into account when the intensity level for the pixel on the 2D display is set. This could be done through a look-up table or algorithm where the desired intensity level for the pixel and aperture combination is converted into the correct pixel intensity value for the angle through which the pixel is seen from the aperture.

There has been described a three dimensional display apparatus (also known as an autostereoscopic display apparatus or a light field display apparatus) comprising: a backlight 2, 6, 10 to emit light from switchable apertures 6, the light being polarized, either on generation or by means of a polariser after the source; a display 4 comprising at least one light modulation panel 320a, 320b with pixels 400 that can be set to change the polarization of light; a polarizer 330 that only transmits light within a limited range of polarizations; wherein each light modulation panel 320a, 320b of the display 4 can change the polarization such that the light passing through the polarizer 330 can both increase and decrease irrespective of the polarization of light before passing the panel; and where the switching of the apertures 6 are synchronised with the switching of the pixels 400 on the at least one light modulation panel 320 of the display 4.

There has been described a three dimensional display apparatus comprising: a backlight 2 comprising apertures 6 where each aperture can switch between emitting light of different properties; a display 4 having at least one light modulation panel 320 comprising pixels 400 that can change the properties of light entering the panel 320 such that the resultant light intensity for the viewer can be both increased and decreased based on the state of the light modulation panel 320 compared to the intensity that would be perceived with no light modulation panel; the switching of the backlight apertures 6 and the at least one light modulation panel 320 being synchronised.

Such a three dimensional display apparatus may be operated by switching apertures 6 of a backlight 2, where each aperture can switch between emitting light of different properties; and changing the properties of at least one light modulation panel 320 of a display 4 to change the properties of light entering the panel 320 such that the resultant light intensity for the viewer can be both increased and decreased based on the state of the light modulation panel 320 compared to the intensity that would be perceived with no light modulation panel; the backlight apertures 6 and the at least one light modulation panel 320 being switched in a synchronised manner.

Increasing Aperture and Display Surface Offset

The depth properties of the 3D display system will depend on the distance between the apertures and the 2D display. Among other things it may affect the position of the focus plane (which may also be described as the plane with best effective resolution) and the range of depths that may be shown with a certain minimum effective resolution. In order to make the display system as compact as possible one may wish to make the apparent optical separation larger than the depth of the display system. This can be achieved in different ways. One way is to use an optical wedge or light guide to create an aperture light source where the apertures appear to be located behind the back end of the display system. The separation can be both positive and negative, i.e. the apertures can be made to appear both behind and in front of the 2D display.

Figure 8:
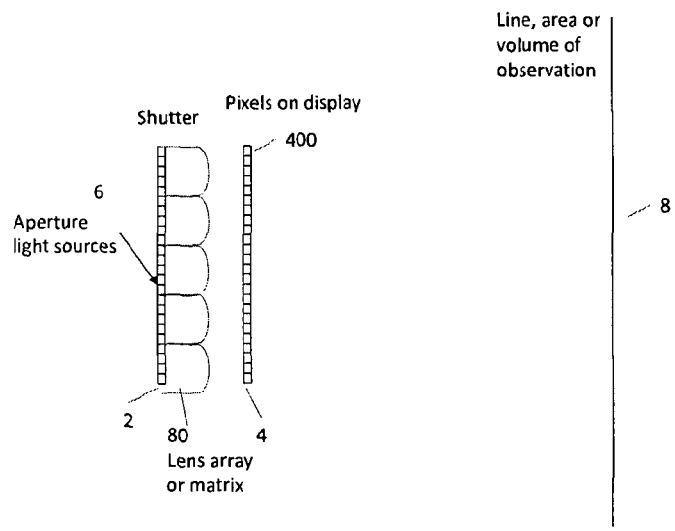
FIG. 8 shows another implementation disclosed herein.

Another way is described in FIG. 8. A lens array, lens matrix or other multiple lens configuration 80 is placed between the aperture light source 6 and the 2D display 4. These types of lens systems 80 are described in detail in prior art, and the term lens arrays is used as a general term for such lens systems in this document. In the example the lenses are larger than the pixels 400 on the display 4, but they may be made both larger, smaller and equal size as the pixels on the display. The aperture light sources 6 may be placed at the focal length of the lens, but also with a small positive or negative offset from the focal length.

Figure 9:
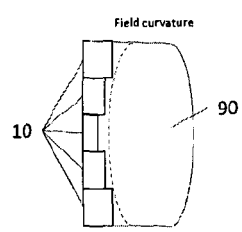
FIG. 9 shows another variation of the configuration of FIG. 8.

FIG. 9 shows a variation of the above configuration where the aperture light sources 10 are arranged to follow the field curvature of the lens 90 in order to provide a more uniform focus for different viewing angles.

The apparent offset between the apertures and 2D display may be varied during operation in order to allow shifting the focus plane in relation to where the best focus plane is for the content being shown. This focus plane may be both behind and in front of the pixel plane. For example, a film may shift its focus from a person in the foreground to a person further back. The focus plane may be determined in the content being shown, or it could be set by tracking where the viewer is focusing its eyes. With several viewers one may have different focus planes for different viewing angles, thereby allowing a unique focus plane for each viewer.

The focus plane may also be shifted rapidly such that the viewer does not notice the shift. The total scene perceived by the viewer will then be a combination of the partial scenes being shown with different focus planes. This way different parts of the scene can have different focus planes.

Figure 10:
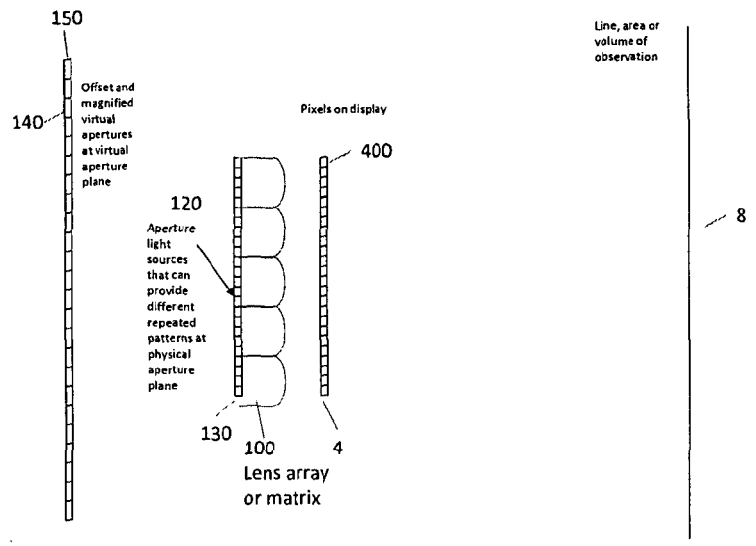
FIG. 10 is an illustration of a system to help explain how the focus place can be set to vary.

There are several ways that the focus place can be set to vary, as explained with reference to FIG. 10:

A lens array 100 may be combined with two or more possible patterns of light sources 120 in the aperture plane 130. Each pattern of light sources 120 and lens array 100 combination may represent a shape moiré or moiré magnification with a given magnification and offset. The lens array will correspond to the revealing layer and the physical aperture plane 120 the base layer. The lens array 100 has a fixed period (the distance between lenses) and the base layer 120 may have periodically repeated patterns with a period that is the same, larger or smaller than the lens period. The pattern may be designed to provide virtual apertures 140 at a virtual aperture plane 150 with a given offset to the 2D display 4 as shown in FIG. 10. By switching between patterns on the base layer 120 it is possible to have at least two states with different offsets of the virtual aperture plane 150.

Figure 11:
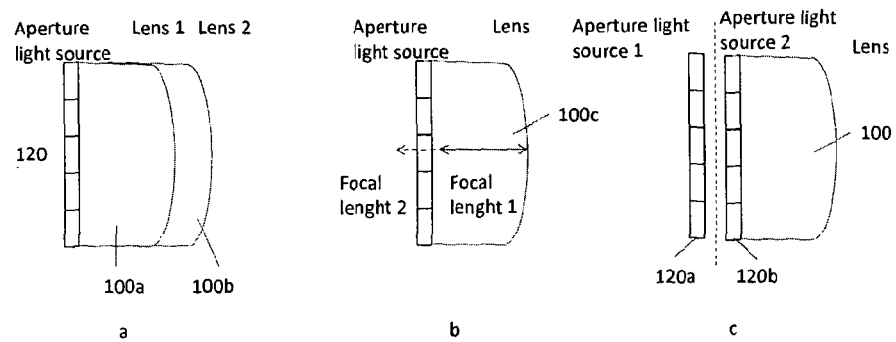
FIGS. 11a, 11b and 11c show various configurations for lens arrays as disclosed herein.

There may be two or more layers of lens arrays 100*a*, 100*b* where each lens array 100 may be switched on or off, and where the focal plane is different for each layer, as illustrated in FIG. 11*a*

A lens array layer 100*c* may be provided where the focus length of the lenses can be switched between two or more states, as illustrated in FIG. 11*b*

Two or more layers of light emitting apertures 120*a*, 120*b* may be provided, where at least one layer 120 can be switched between transparent and light emitting, as illustrated in FIG. 11*c*

The methods above may be combined.

The pattern on the base layer 130 of the shape moiré described above may have a different period for different viewing angles, thereby allowing different offsets for the virtual aperture plane for different viewing angles. As described above this could be used to provide different focus planes for different viewers.

Driving Schemes

Another problem to overcome is that the response time for the aperture light source 10 and the 2D display 4 is finite. Current LCDs have a response time that is significant compared to the short sub-frame duration of the autostereoscopic display system described. Image quality may be improved by taking the response time of both light source and display into consideration when designing the driving scheme.

Figure 12:
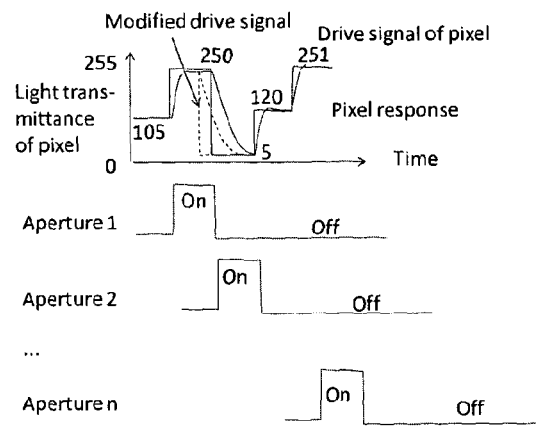
FIG. 12 shows an example of where the response time of the light source is fast in relation to the display.

In FIG. 12 a first example is provided where the response time of the light source is fast in relation to the display. The drive signal for the pixel on the display that is being analysed is shown in the top graph. The signal is synchronized with the drive signal for the apertures 1 to n. There may be a delay between the sync signal from the display pixel to the aperture if the response of the aperture is faster than that of the pixel. The response for the pixel is shown as a curve in the top graph. The display has an asymmetric response in this example. The high to low state switching time (fall time) is different to the low to high state switching time (rise time). In this case the fall time is slower than the rise time. One problem that this causes is that the effective intensity for a particular pixel and aperture combination will depend on the next and previous state for the pixel. FIG. 12 shows how the pixel state goes from 250 to 5 to 120 and finally to 251. In this example the pixel response curve clearly shows that during the time period when the drive signal is at S the effective pixel state will be considerably higher than 5, which it would not have been if the state had been 5 or lower in the previous time period (where the drive signal was 250 in the example shown in FIG. 12). There are different ways that this effect may be reduced in order to give a better colour reproduction.

The level of drive signal may be adjusted such that it depends on the previous state and/or the next state as well as just the current state.

The time length of the drive signal can be changed depending on the previous state and/or the next state as well as just the current state. For example, there may be a different sync signals for pixels going high to low from pixels going low to high (there may be a third sync signal for an unchanged state or unchanged states may be treated the same as one of the other transitions). In the example shown in FIG. 12 the dotted line shows how the synch signal for the high to low transition is moved to make the drive pulse shorter for the case when the pixel state is going from high to low. In the example the sync signal to the aperture is unaffected and uses the low to high signal. However, other combinations are possible.

Variable Geometry

Figure 13:
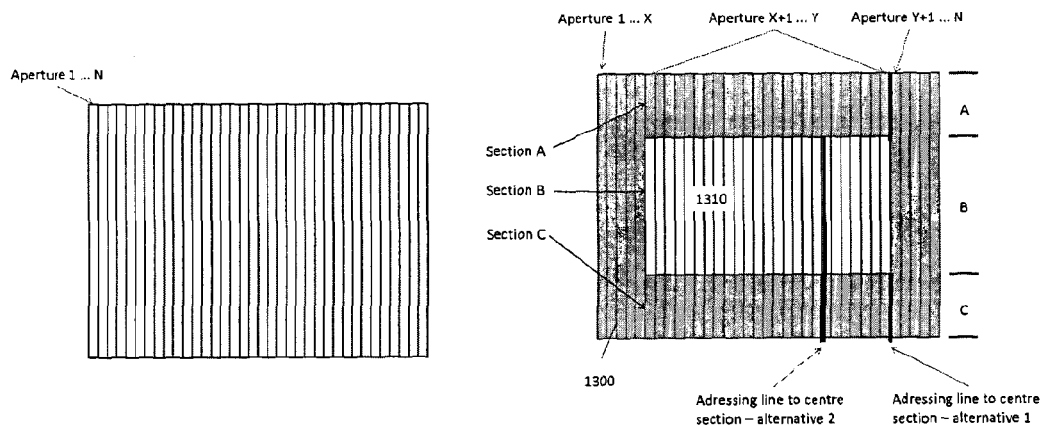
FIG. 13 illustrates an embodiment in which an area on the aperture plane where apertures are switched according to normal operation could be varied.

Depending on the type of scene that is being shown on the display different display geometries may be the most appropriate. For example the area of the active apertures in the aperture plane compared to the area of the image on the 2D display will give the display different properties. One ratio may be more appropriate for a film scene, while another ratio may be more appropriate for showing a floating object in the centre of the display. One reason for this is that the edge of the display and aperture plane may have an influence on the perceived depth. The following ways are examples of how these properties may be changed through user settings during operation of the display:

The area on the aperture plane where apertures are switched according to normal operation could be varied. One way to achieve this is shown in FIG. 13. The image to the left shows all apertures switching normally in the full area. The image to the right shows a black frame 1300 around a smaller central area 1310. In the central area 1310 the apertures are switched normally. The frame 1300 may be achieved by setting the apertures 1 to X as well as Y+1 to N in a black state. Also, the slits in this example may be split into a number of segments, in this example segments A, B and C. These may be addressed separately through the use of separate addressing lines to each segment. The addressing lines could be made up of small conductive wires shown as bold lines in the figure. These could either all come from the same edge (alternative 2) or from different edges (alternative 1).

The full area of the 2D display does not need to be used for showing active images. A frame 1300 around a central area 1310 may be defined where the frame can be set in a black state.

Compact Projection System

Figure 14:
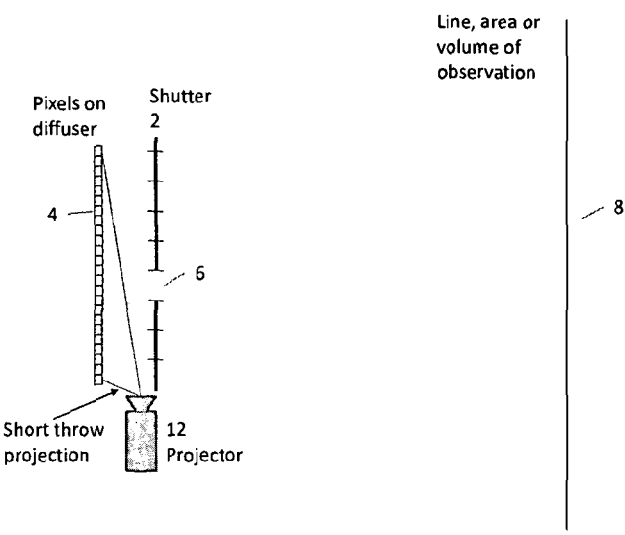
FIG. 14 illustrates one way to reduce the depth of the system.

When using a projection system for the 2D display the total depth of the system may be relatively large. One way to reduce the depth of the system is illustrated in FIG. 14. Rather than using rear projection the image on the 2D display 4 is created through a short throw front projection. A projector 12 is placed between the aperture plane 2 and the display plane 4. The actual orientation of the projector 12 does not need to be vertical as shown in the figure and parts of the projector may extend beyond either the aperture plane 2 and/or display plane 4.

Figure 15:
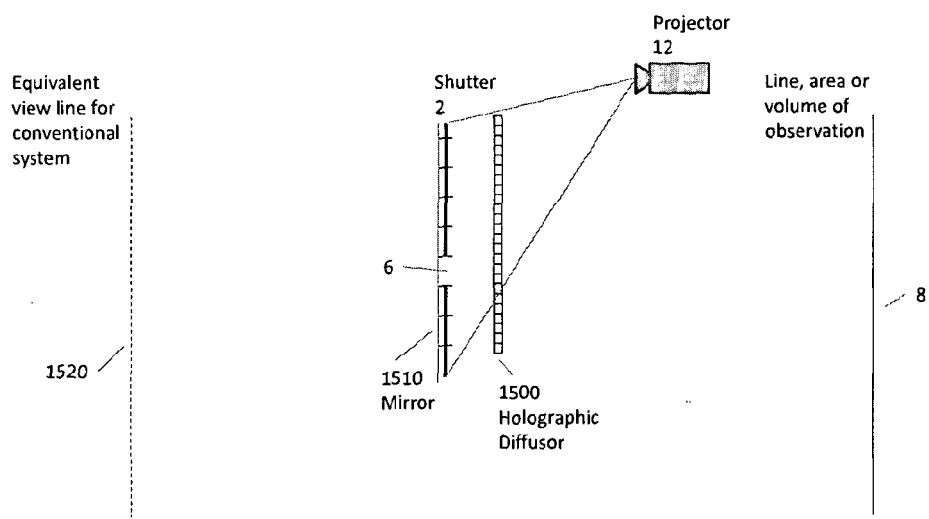
FIG. 15 shows another configuration disclosed herein.

FIG. 15 shows another configuration. In this a diffuser 1500 is placed between the aperture plane 2 and a viewer on the line of observation 8. The diffuser 1500 has different properties in different directions such that it acts as a diffuser for the projector when seen from the aperture plane. However, from the line of observation 8 the diffuser 1500 is transparent for light coming from the aperture plane 2. One way to achieve this is through the use of a special holographic diffuser 1500. The apertures are adjacent to a mirror 1510. The operation is as follows: (1) The projector 12 projects an image on the diffuser 1500 which acts as a scattering diffusor, (2) the image is only reflected in the mirror 1510 where an aperture 6 is open, (3) the diffuser 1500 acts as transparent glass for the reflected image from the viewing line 8. Hence the viewer will get the same 3D effect that a viewer would get from the dashed line 1520 in a conventional system without a mirror.

The invention claimed is:

1. An autostereoscopic display apparatus for displaying a three-dimensional image, comprising:
a backlight to emit light from switchable apertures, the light being polarized;
a plurality of light modulation panels, each panel comprising pixels that can be set to change the polarization of the light emitted from the switchable apertures; and
a polarizer arranged to receive the emitted light having passed through the plurality of light modulation panels and arranged to transmit light within a limited range of polarizations;
wherein each light modulation panel is controllable to change the polarization of the emitted light between a first polarization, a second polarization and at least one intermediate polarization such that an intensity of the emitted light after passing through the polarizer, as perceived by a viewer, can be both increased and decreased irrespective of the polarization of the emitted light before passing the plurality of light modulation panels, and wherein switching of the apertures is synchronized with the switching of the pixels on the plurality of light modulation panels, and
wherein each light modulating panel provides a first twist value when an applied voltage is at an off voltage, a second twist value when the applied voltage is at a fully on voltage, and a third twist value different from said first and second twist values when the applied voltage is between the off voltage and fully on voltage.

2. An autostereoscopic display apparatus according to claim 1, wherein each light modulation panel is a liquid crystal display.

3. An autostereoscopic display apparatus according to claim 1, wherein the backlight is an LED display or an OLED display.

4. An autostereoscopic display apparatus according to claim 1, wherein a state of a pixel on each of the plurality of light modulation panels is arranged to be adapted according to an angle through which a viewer will see a lit aperture through the pixel, the lit aperture being one of the switchable apertures.

5. An autostereoscopic display apparatus comprising:
an aperture array comprising a plurality of switchable apertures;
a backlight arranged to emit polarized light from the plurality of switchable apertures; and
a plurality of light modulation panels, each comprising pixels that can change polarization of the emitted light entering the light modulation panel between a first polarization, a second polarization and at least one intermediate polarization such that the resultant light intensity for a viewer can be both increased and decreased based on a state of the pixels of the light modulation panel compared to an intensity of the emitted light that would be perceived with no light modulation panels;
wherein switching of the switchable apertures and switching of the pixels of the plurality of light modulation panels is synchronized, and
wherein each light modulating panel provides a first twist value when an applied voltage is at an off voltage, a second twist value when the applied voltage is at a fully on voltage, and a third twist value different from said first and second twist values when the applied voltage is between the off voltage and fully on voltage.

* * * * *